United States Patent
Weidemann et al.

(10) Patent No.: US 10,464,563 B2
(45) Date of Patent: Nov. 5, 2019

(54) METHOD FOR OPERATING A MULTI-AXLE DRIVE TRAIN FOR A VEHICLE AND CORRESPONDING MULTI-AXLE DRIVE TRAIN

(71) Applicant: AUDI AG, Ingolstadt (DE)

(72) Inventors: Dieter Weidemann, Stammham (DE); Heiko Hanickel, Kipfenberg (DE); Florian Kolb, Gößweinstein (DE); Hans Jörg Brühl, Kösching (DE)

(73) Assignee: AUDI AG, Ingolstadt (DE)

( * ) Notice: Subject to any disclaimer, the term of this patent is extended or adjusted under 35 U.S.C. 154(b) by 267 days.

(21) Appl. No.: 15/524,372

(22) PCT Filed: Nov. 5, 2015

(86) PCT No.: PCT/EP2015/075791
§ 371 (c)(1),
(2) Date: May 4, 2017

(87) PCT Pub. No.: WO2016/071437
PCT Pub. Date: May 12, 2016

(65) Prior Publication Data
US 2018/0273041 A1 Sep. 27, 2018

(30) Foreign Application Priority Data
Nov. 6, 2014 (DE) .................. 10 2014 016 450

(51) Int. Cl.
*B60W 30/18* (2012.01)
(52) U.S. Cl.
CPC . *B60W 30/18181* (2013.01); *B60W 2520/403* (2013.01); *B60W 2720/403* (2013.01)

(58) Field of Classification Search
CPC .......... B60K 23/0808; B60K 2023/085; B60K 2023/0858; B60W 10/119;
(Continued)

(56) References Cited

U.S. PATENT DOCUMENTS 4,989,686 A * 2/1991 Miller ................ B60K 23/0808
180/197
5,219,038 A 6/1993 Hamada et al.
(Continued)

FOREIGN PATENT DOCUMENTS

CN 102933418 A 2/2013
CN 103442922 A 12/2013
(Continued)

OTHER PUBLICATIONS

Translation of the International Preliminary Report on Patentability dated May 18, 2017, in connection with corresponding international Application No. PCT/EP2015/075791 (7 pgs).
(Continued)

*Primary Examiner* — Erin D Bishop
(74) *Attorney, Agent, or Firm* — Maier & Maier, PLLC

(57) ABSTRACT

A device and a method for operating a multi-axle drive train for a vehicle. A first axle is operatively connected permanently and a second axle is operatively connected at least intermittently via a clutch to a drive device. For the second axle coupled to the drive device, a maximum torque of the drive device is reduced by a specific safety value. At drive start, the safety value is set to a specific initial value and subsequently is reduced or increased throughout a specific period of time.

9 Claims, 1 Drawing Sheet

(58) Field of Classification Search
CPC ......... B60W 30/18172; B60W 50/038; B60W 2300/18; B60W 2300/185; B60W 2520/26; B60W 2520/263; B60W 2520/40; B60W 2520/403; B60W 2720/26; B60W 2720/263; B60W 2720/40; B60W 2720/403; B60W 2710/0666
See application file for complete search history.

(56) References Cited

U.S. PATENT DOCUMENTS

| | | | | |
|---|---|---|---|---|
| 5,742,917 | A * | 4/1998 | Matsuno | B60K 17/3462 |
| | | | | 180/197 |
| 6,209,673 | B1 * | 4/2001 | Barlage | B60K 17/00 |
| | | | | 180/245 |
| 8,285,465 | B2 * | 10/2012 | Wu | B60K 23/0808 |
| | | | | 180/244 |
| 2005/0029034 | A1 * | 2/2005 | Stervik | B60W 10/06 |
| | | | | 180/248 |
| 2007/0039770 | A1 | 2/2007 | Barrette et al. | |
| 2009/0318265 | A1 | 12/2009 | Ginther | |
| 2013/0066534 | A1 | 3/2013 | Foussard et al. | |

FOREIGN PATENT DOCUMENTS

| | | |
|---|---|---|
| CN | 103826955 A | 5/2014 |
| DE | 4036280 A1 | 5/1991 |
| DE | 102009031500 A1 | 1/2011 |
| DE | 102012011181 A1 | 12/2013 |
| EP | 2 241 470 A2 | 10/2010 |
| GB | 2488527 A | 9/2012 |

OTHER PUBLICATIONS

International Search Report dated Feb. 17, 2016 in corresponding International application PCT/EP2015/075791; 4 pages.
Chinese Office Action dated Oct. 24, 2018 in corresponding Chinese patent application No. 201580060213.6; 18pgs.
Office Action dated Jun. 13, 2019, in corresponding Chinese Application No. 201580060213.6; 10 pages.

* cited by examiner

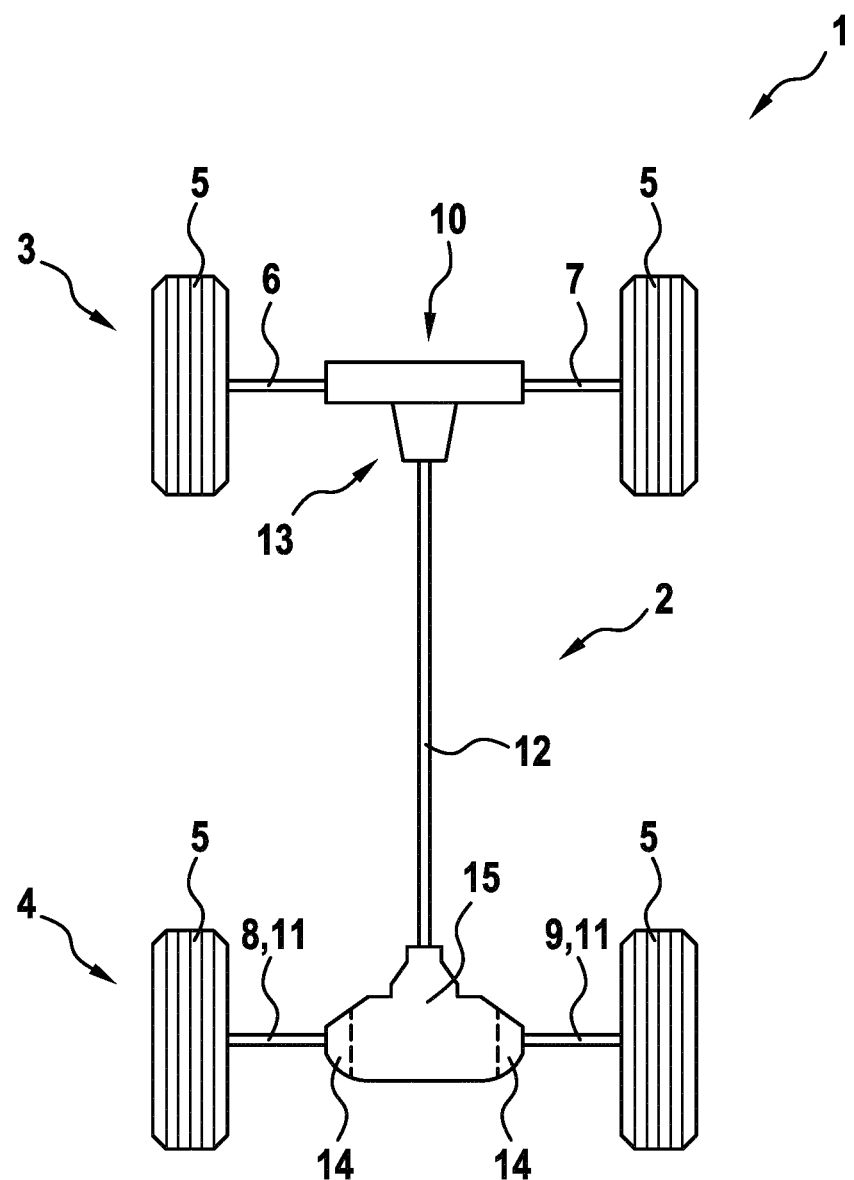

METHOD FOR OPERATING A MULTI-AXLE DRIVE TRAIN FOR A VEHICLE AND CORRESPONDING MULTI-AXLE DRIVE TRAIN

FIELD

The invention relates to a method for operating a multi-axle drive train for a motor vehicle, wherein a first axle is operatively connected permanently and a second axle is operatively connected at least intermittently via a clutch to a drive device, and wherein, for the second axle coupled to the drive device, a maximum torque of the drive device is reduced by a specific safety value. The invention further relates to a multi-axle drive train.

BACKGROUND

The multi-axle drive train can be used for a motor vehicle, for example, and can be a component of the motor vehicle, in particular. The multi-axle drive train makes it possible to drive a plurality of axles—for example, the first axle, in particular a front axle, and the second axle, in particular a rear axle—of the motor vehicle. An operative connection between the axles of the motor vehicle can be produced in this case via a connecting shaft, which, for example, is present as a Cardan shaft. Often, it is desirable that a multi-axle operation is carried out by means of the multi-axle drive train only intermittently, during which time a plurality of the axles are actually driven. In the case of a motor vehicle, this is necessary, for example, only if the traction would be too small when only one of the axles is driven and/or if the desired driving performance can be realized only with a multi-axle drive. Therefore, it is often appropriate to drive only one of the axles, namely the first axle, by means of the multi-axle drive train.

For this reason, the first axle is operatively connected permanently to the drive device. In this case, the drive device has, for example, at least one drive assembly, in particular an internal combustion engine. Furthermore, the drive device can comprise at least one transmission gearbox and/or one starting clutch. The second axle is operatively connected via the clutch to the drive device. When the clutch is open, the operative connection between the drive device and the second axle is insofar disengaged. When the clutch is at least partly, in particular fully closed, in contrast, at least a portion of the torque supplied by the drive device is transmitted to the second axle. An embodiment of this kind for the multi-axle drive train may be referred to, for example, as a "hang on" drive train.

If the clutch is closed, then both the first axle and the second axle are driven by means of the drive device, and thus the torque supplied by the drive device is distributed between them based on the potential power that can be delivered to each axle. If the engageable second axle cannot transmit adequate torque because, for example, the coefficient of friction between the wheels of the second axle and an underlying ground of the motor vehicle is too small, in particular because the wheels are resting on ice, the torque of the drive device that cannot be transmitted via the second axle is delivered to the rigidly coupled first axle.

The first consequence thereof is that the first axle or the operative connection between the drive device and the first axle has to be designed in such a way that the entire torque that can be supplied by the drive device shall be applied to the first axle without the expectation of any damage. Alternatively, it is provided that the maximum torque of the drive device is reduced by the specific safety value when the second axle is coupled to the drive device.

In this case, the specific safety value corresponds preferably to the difference between the maximum torque of the drive device and the maximum torque that is to be transmitted to the first axle and for which no damage is expected to occur. The maximum torque, minus the specific safety value, thus corresponds to this torque, which can be delivered without any problem to the first axle or can be transmitted via the first axle. The maximum torque is understood to mean the torque that is maximally produced by the drive device or shall be maximally delivered to the first axle and/or to the second axle. The torque supplied by the drive device is insofar limited upward, that is, in the direction of larger values, to the maximum torque. The torque supplied by the drive device or delivered to the first axle and/or to the second axle should therefore always be less than or equal to the maximum torque.

SUMMARY OF THE DISCLOSURE

It is now the object of the invention to propose a method for operating a multi-axle drive train for a motor vehicle that offers advantages over the prior art and, in particular, enables an optimal utilization of the torque that can be produced by the drive device.

It is thereby provided that, at drive start, the safety value is set to a specific initial value and subsequently reduced or increased throughout a specific period of time. Drive start is understood to mean, for example, the point in time at which the drive device—for example, an internal combustion engine—is started. Alternatively, the point in time may also refer to the point in time at which the motor vehicle begins to be placed in motion or at which the second axle is coupled to the drive device. In particular, as the point in time, it is possible to use the point in time at which, first of all, two conditions are met: The driving speed is zero—that is, the motor vehicle is standing still—and the second axle is coupled to or operatively connected to the drive device.

The reduction of the maximum torque of the drive device by the specific safety value poses a problem insofar as the second axle, coupled to the drive device, can never obtain the full potential of the drive device, because the maximum torque that can at most be obtained from the drive device is reduced. On the other hand, the reduction of the maximum torque is only needed when the portion of the torque transmitted to the second axle is too small, because, for example, the coefficient of friction is too small.

If, in contrast, it is possible to transmit an adequately large torque via the second axle to the underlying ground, then the reduction of the maximum torque is not necessary, because it is distributed onto the first axle and the second axle. For this reason, at drive start, the safety value should be set at first to the initial value. In doing so, this initial value is to be chosen in such a way that the reduced maximum torque corresponds to the torque that can be transmitted safely via the first axle or to the first axle, without the fear of any damage occurring. Subsequently, however, it is provided that the specific safety value is reduced, so that, correspondingly, the maximum torque that is reduced by the specific safety value is increased in the direction of its (not reduced) initial value. The reduction occurs in this case throughout the specific period of time.

Alternatively, it can be provided that the initial value is smaller than the above-discussed value—for example, it is identical to zero. However, it can also be greater than zero and, in this case, at most 10%, at most 20%, at most 30%, at most 40%, at most 50%, at most 60%, at most 70%, at most 80%, or at most 90% of the mentioned value. In this case, the initial value is preferably increased throughout the specific period of time—for example, when a safety requirement that will be discussed below arises—in particular, only and/or initially when the safety requirement arises. More preferably, it is provided that the safety value is increased when at least one of the conditions and, in particular, all conditions for a reduction of the safety value is or are not met, and vice versa.

The described procedure for reducing or increasing the safety value has the advantage that, on the one hand, in a known way, a safe operation of the multi-axle drive train is ensured and, on the other hand, the full potential of the drive device can be exploited in that, at least intermittently, the non-reduced maximum torque is applied to the first axle and the second axle and is transmitted via them, preferably in full, to the underlying ground, that is, is insofar used for acceleration of the motor vehicle.

In another embodiment of the invention, it is provided that a power transmission potential of the wheels of the second axle is determined. Thus, it is provided that, at drive start and/or after drive start, it is determined how large a wheel force can be transmitted reliably via the wheels of the second axle. Obtained from these wheel forces is the power transmission potential for the second axle.

An enhancement of the invention provides that a differential rotational speed of the clutch is determined from a rotational speed on the drive device side and a rotational speed of the clutch on the wheel side. As already discussed, the second axle can be coupled via the clutch to the drive device. In this case, the clutch has an input shaft as well as an output shaft, wherein the former is preferably operatively connected rigidly and/or permanently to the drive device and the latter is operatively connected rigidly and/or permanently to the second axle. The rotational speed on the drive device side then corresponds to the rotational speed of the input shaft, whereas the wheel-side rotational speed corresponds to the rotational speed of the output shaft. The differential rotational speed can be determined from the rotational speeds of the two shafts. If the differential rotational speed of the clutch differs from zero, then there is clutch slippage.

In another embodiment of the invention, it is provided that, for a first drive train part that mechanically links the drive device to the first axle, a first torsional value is determined and, for a second drive train part that operatively connects the drive device to the second axle, a second torsional value is determined. The torsional values are understood, in particular, to mean the torque acting on each drive train part or the deformation and, in particular, the twisting caused by it, wherein, in particular, the sign of this torque or the deformation is considered. The deformation occurs on account of the applied torque, because the first drive train part as well as the second drive train part have a specific elasticity.

An especially preferred embodiment of the invention provides that the wheel force transmitted by the wheels is determined from an acceleration of the motor vehicle. The acceleration of the motor vehicle can be determined in different ways, especially preferably by using an acceleration sensor. It is then possible from the acceleration to draw directly a conclusion as to the wheel force that is transmitted in total from the wheels of the motor vehicle to the underlying ground.

An especially advantageous embodiment of the invention provides that, in determining the wheel force, a minimum weight and/or a maximum wheel circumference are or is used. In order to calculate the wheel force from the acceleration of the motor vehicle, both the weight and the circumference of the wheels are required. For the weight, preferably the minimum weight of the motor vehicle—thus, for example, an empty weight of the motor vehicle—is employed.

It can be entered as a fixed value. The wheel circumference corresponds, for example, to the maximum wheel circumference that the wheels are allowed to have. This maximum wheel circumference can also be entered, for example, as a fixed value. Alternatively, it is obviously possible to determine the weight and/or the wheel circumference in a different way—for example, by estimation or measurement.

Another advantageous embodiment of the invention provides that a distance traversed by the motor vehicle is determined, in particular by integration of the acceleration. It was already discussed above that the acceleration of the motor vehicle is determined in order to draw a conclusion from it as to the wheel force transmitted by the wheels. In addition, it is possible to determine from the acceleration the distance traversed by the motor vehicle in that the acceleration is integrated or doubly integrated over a specific period of time. The specific period of time begins, for example, at drive start and ends at the current point in time.

In an enhancement of the invention, it is provided that the safety value is reduced by a specific amount when the traversed distance corresponds to at least one wheelbase of the motor vehicle and/or the differential rotational speed of the clutch is less than a threshold value and/or the acceleration of the motor vehicle corresponds to an expected longitudinal acceleration and/or a time course of the first torsional value and/or a time course of the second torsional value exhibit or exhibits no load change. At least one of the mentioned conditions must be met for the safety value to be reduced. More preferably, a plurality of the mentioned conditions and, in particular, all of the mentioned conditions need to be met.

The wheelbase of the motor vehicle is especially preferably equal to the distance between the first axle and the second axle. Once the traversed distance at least corresponds to or is greater than this wheelbase, it is possible to conclude that the motor vehicle has traversed an adequately large distance in order that the further conditions can be reliably evaluated.

Additionally or alternatively, it is checked whether the differential rotational speed is less than a threshold value. If this is the case, then there is no slippage of the clutch or only a small slippage and it can be concluded that an adequately large torque can be delivered via the second axle. Correspondingly, if the condition is met, it may be possible to reduce the specific safety value, so that the maximum torque is increased. This is especially the case when the clutch is adjusted depending on the actual torque delivered via the second axle and, in particular, is controlled. For example, the clutch is adjusted in such a way that the torque delivered via the second axle is at a maximum.

In addition, it can be provided, additionally or alternatively, that the acceleration of the motor vehicle, in particular the longitudinal acceleration, is compared to the expected acceleration, in particular the expected longitudinal acceleration. If the actual acceleration corresponds to the expected acceleration, it can thereby be concluded that the torque supplied by the drive device is delivered via the wheels of the motor vehicle, in particular without slippage or with slippage in an allowable range. The expected acceleration is determined, for example, from the current torque produced by the device, which may be referred to as the drive torque.

Furthermore, it can be provided that the time course of the first torsional value and/or of the second torsional value is considered. If no load change is to be inferred from them during the time course under consideration, then this is an indication that it is possible, via the second axle, to reliably deliver an adequately large torque. In this case, too, it is insofar possible to reduce the specific safety value.

Furthermore, in an advantageous embodiment of the invention, it can be provided that the safety value is increased when a safety requirement arises. When a safety requirement arises, the reduction can thus be terminated or at least discontinued in the event that it has been carried out beforehand. After a specific period of time, during which the safety value was reduced, it is thus possible to increase the safety value once again, in particular when a safety requirement arises. If the safety requirement is cancelled subsequently once again, then the reduction can be recommenced. Obviously, the increase in the safety value can also be carried out even when it was not reduced beforehand.

The safety requirement arises, for example, when the differential rotational speed of the clutch exceeds a specific threshold value, that is, when slippage or slippage that is too strong occurs. Additionally or alternatively, it arises when the acceleration of the motor vehicle, in particular, the longitudinal acceleration, is less than the expected acceleration. In addition, it can be provided that the safety requirement arises when the first torsional value and/or the second torsional value indicate or indicates a relief of the first drive train part or of the second drive train part, even though the torque transmitted from the drive device to the first drive train part and/or to the second drive train part remains constant or increases.

Likewise, the safety requirement can arise when the first torsional value and/or the second torsional value indicate or indicates an uneven torsion of the drive train parts, in particular, therefore, when the torsional values are not equal or the difference between them exceeds a specific torsional value limit. Even when the first torsional value and/or the second torsional value do not attain an expected value, the safety requirement can arise. The expected value is determined, for example, from the torque produced by or transmitted by the drive device. Preferably, the first torsional value is compared to a first expected value and the second torsional value is compared to a second expected value. The expected values can be identical to each other or different from each other. Preferably, they are determined—as discussed—from the torque produced by the drive device.

The safety requirement arises, for example, when at least one of the mentioned conditions is met. Alternatively, it can also arise only when a plurality of conditions are met.

Finally, it is possible, in an advantageous embodiment of the invention, to provide that the safety value is reduced stepwise or continuously. If at least one, and preferably a plurality of or all of the aforementioned conditions is or are met, then the specific safety value can be reduced. This is carried out either stepwise or continuously. When the reduction of the specific safety value is carried out stepwise, the safety value is reduced at intervals in time in each instance, whereas it remains constant in between. In contrast, a continuous reduction is understood to mean an essentially continuous reduction using a specific time gradient. The aforementioned increase in the safety value can be carried out, in analogy to the reduction, stepwise or continuously. The corresponding implementations can insofar be employed.

The invention further relates to a multi-axle drive train for a motor vehicle, in particular for carrying out the method discussed above, wherein a first axle is operatively connected permanently and a second axle is operatively connected at least intermittently via a clutch to a drive device, and wherein, for the second axle coupled to the drive device, a maximum torque of the drive device is reduced by a specific safety value. In this case, it is provided that the multi-axle drive train is designed in such a way that, at drive start, the safety value is set to a specific initial value and subsequently reduced or increased throughout a specific period of time.

The advantages of such a procedure or such an embodiment of the multi-axle drive train have already been addressed. Both the multi-axle drive train and the method can be developed further in accordance with the above embodiments, so that reference is insofar made to them.

BRIEF DESCRIPTION OF THE DRAWING

The invention will be discussed in detail below on the basis of the exemplary embodiments illustrated in the drawing, without any limitation of the invention thereby occurring. Shown in the sole FIGURE is:

A schematic illustration of a multi-axle drive train for a motor vehicle.

DETAILED DESCRIPTION OF THE DRAWING

The FIGURE shows a multi-axle drive train 1 for a motor vehicle, which is not illustrated further. The multi-axle drive train 1 has a multi-axle drive device 2, which serves for optional operation only of a first axle 3 or of the first axle 3 as well as a second axle 4. In the exemplary embodiment illustrated here, each of the axles 3 and 4 has two wheels 5, which are arranged on partial axles 6 and 7 of the first axle 3 and partial axles 8 and 9 of the second axle 4. It can then be provided that the partial axles 6 and 7 of the first axle 3 form a first output shaft 10. Especially preferably, however, they are joined via a differential gear, in particular an axle differential gear, to the first driven shaft 10, that is, in particular, are operatively connected to it rigidly and/or permanently. The partial axles 8 and 9 can each exist as a second output shaft 11. Alternatively, it can be provided that the partial axles 8 and 9 are joined via a differential gear, in particular an axle differential gear, to the second output shaft 11.

The multi-axle drive device 2 has a connecting shaft 12, via which an operative connection between the first axle 3 and the second axle 4 can be produced. The connecting shaft 12 is preferably designed as a Cardan shaft. A synchronizing clutch 13 is arranged in a operative connection between the first output shaft 10 and the connecting shaft 12. The synchronizing clutch 13 is preferably designed as a force-locking clutch. It makes possible, in particular, the transmission of any portion of the applied torque. In addition, a separating clutch 14 is arranged in an operative connection between the connecting shaft 12 and the second output shaft 11. In the exemplary embodiment illustrated here, two separating clutches 14 are insofar present, wherein one of the separating clutches 14 is arranged in each case between a differential gear 15 and one of the two second output shafts 11 or the partial axles 8 and 9.

In this case, the connecting shaft 12 is operatively connected rigidly and/or permanently to the differential gearbox 15. The operative connection between the differential gear 15 and thus the connecting shaft 12, on the one hand, and the second output shafts 11 in the form of the partial axles 8 and 9, on the other hand, can optionally be produced or disengaged by means of the separating clutch 14. Preferably, the separating clutches 14 are always in the same position, so that a operative connection between the connecting shaft 12, on the one hand, and the partial axles 8 and 9, on the other hand, is either produced or disengaged.

In a first operating state of the multi-axle drive device 2, the synchronizing clutch 13 and the separating clutch 14 are open, so that the operative connection between the first output shaft 10 and the second output shaft 11 is disengaged. Insofar as solely a separating clutch 14 or a second output shaft 11 is addressed below, both output shafts 11 or both separating clutches 14 are meant in the scope of the present exemplary embodiment. In a second operating state, the synchronizing clutch 13 and the separating clutch 14 are fully closed. The separating clutch 14 is preferably designed as a positive-locking clutch, in particular as a dog clutch.

In the scope of the multi-axle drive train 1 presented here, the first axle 3 is operatively connected to a drive device, which is not illustrated here, or is driven by it. The second axle, in contrast, is operatively connected only intermittently via a clutch coupling to the drive device and insofar driven by it. The clutch coupling can be represented by the synchronizing clutch 13 and/or the separating clutches 14. In this case, it is only of importance that, by means of the clutch coupling, the operatively connected between the drive device and the second drive shaft 11 can be disengaged.

The multi-axle drive train 1 is then operated in such a way that, for the second axle 4 coupled to the drive device, a maximum torque of the drive device is reduced by a specific safety value. This safety value is to be set at drive start to a specific initial value and subsequently reduced throughout a specific period of time. Obviously, it can also be provided that the safety value is increased once again when specific conditions arise, that is, changed in the direction of the initial value. In this way, the maximum torque that is available is reduced.

The invention claimed is:

1. A method for operating a multi-axle drive train for a vehicle, comprising:
operatively connecting permanently a first axle to a drive device and operatively connecting at least intermittently via a clutch a second axle to the drive device; for the second axle coupled to the drive device, reducing a maximum torque of the drive device by a specific safety value, wherein the maximum torque denotes the maximum torque that can be generated by means of the drive device; at drive start, setting the safety value to a specific initial value and subsequently decreasing or increasing the safety value throughout a specific period of time;
wherein the initial value corresponds to a difference between the maximum torque and a maximum torque transmissible to the first axle at which no damage is to be expected.

2. The method according to claim 1, wherein a power transmission potential of one or more wheels of the second axle is determined.

3. The method according to claim 1, wherein a differential rotational speed of the clutch is determined from a rotational speed of the clutch on a drive device side and a rotational speed of the clutch on a wheel side.

4. The method according to claim 1, wherein for a first drive train part that operatively connects the drive device to the first axle, a first torsional value is determined and, for a second drive train part that operatively connects the drive device to the second axle, a second torsional value is determined.

5. The method according to claim 4, wherein the safety value is reduced by a specific amount when a traversed distance corresponds at least to a wheelbase of the vehicle, and a differential rotational speed of the clutch is less than a threshold value, and an acceleration of the vehicle corresponds to an expected acceleration, and a time course of the first torsional value and a time course of the second torsional value exhibit no load change.

6. The method according to claim 1, wherein a wheel force transmitted by one or more wheels is determined from an acceleration of the vehicle.

7. The method according to claim 6, wherein a minimum weight and a maximum wheel circumference is used for determining the wheel force.

8. The method according to claim 6, wherein a distance traversed by the vehicle is determined by integration of the acceleration.

9. The method according to claim 1, wherein the safety value is increased when a safety requirement arises.

* * * * *